April 2, 1940.  W. M. ANDERSON  2,195,638
ELECTRIC TOASTER
Filed Oct. 18, 1937   5 Sheets-Sheet 1

Fig. 1

Inventor
William M. Anderson
By Merchant & Merchant
Attorneys

April 2, 1940.  W. M. ANDERSON  2,195,638
ELECTRIC TOASTER
Filed Oct. 18, 1937  5 Sheets-Sheet 2

Inventor
William M. Anderson
By Merchant & Merchant
Attorneys

April 2, 1940.　　W. M. ANDERSON　　2,195,638
ELECTRIC TOASTER
Filed Oct. 18, 1937　　5 Sheets-Sheet 4

Inventor
William M. Anderson
By Merchant & Merchant
Attorneys

April 2, 1940.  W. M. ANDERSON  2,195,638
ELECTRIC TOASTER
Filed Oct. 18, 1937   5 Sheets-Sheet 5

Inventor
William M. Anderson
By Merchant & Merchant
Attorneys

Patented Apr. 2, 1940

2,195,638

UNITED STATES PATENT OFFICE 2,195,638

ELECTRIC TOASTER

William M. Anderson, Minneapolis, Minn., assignor to F. J. Kerner and himself, both of Minneapolis, Minn., a copartnership Application October 18, 1937, Serial No. 169,638

11 Claims. (Cl. 219—19)

My present invention relates to cooking apparatus of the character generally designated as electric toasters and generally stated, consists in novel device, combinations of devices and arrangements of parts hereinafter described and defined in the claims.

More definitely stated, my present invention relates to the automatic controls for electric toasters and has as an important object the provision of an automatic electric toaster in which each slice of bread or analogous sheet material progressively subjected to heat within the toaster will be uniformly treated.

Another important object of the invention is the provision in an automatic electric toaster in which the first and each successive slice of bread or analogous sheet material successively treated in the toaster, starting from the first piece treated after energization of the heating element or elements will be automatically uniformly heat treated entirely without manual control.

In a more specific sense, the invention relates to improvements in toasters of the type wherein bread or analogous sheet material is passed through the toasting oven and is subject to heat while moving through the oven, and which type of toaster is represented in my application, filed of even date herewith under Serial Number 169,637.

In my present application, the various controls and combination of control elements constituting the various phases of the invention are shown as incorporated in the heating element and motor circuits of the toaster disclosed and claimed in my above identified application, filed of even date herewith.

In the accompanying drawings, like characters indicate like parts throughout the several views.

Referring to the drawings.

First to be described will be the preferred toaster mechanism which is common to my previously identified application of even date herewith, and to which the various novel features of this invention are herein illustrated as being incorporated.

The main body of the toaster is made up of two main parts to wit; an elongated pressed metal base 18; and a shell or casing 19 that is mounted on the base 18. The open bottom of the base 18 rests on and is normally closed by a mounting plate 20 that is provided with suitable feed 21.

The shell or casing 19 is made up of oppositely disposed like sections 22 that are mounted upon the top of the base 18 by means of integrally formed anchor lugs 23 that are passed through suitable apertures in the base 18 and are bent over beneath the top of the base. These shell sections 22 are laterally spaced at their opposite end portions to provide aligned inlet and outlet openings 24 and 25, respectively. At their intermediate top portions, the shell sections 22 are provided with inwardly turned bridge sections 26, which together bridge the space between the sections 22 and may be assumed to be suitably tied together by welding or the like. As will hereinafter be seen, the so called bridge sections 26 form the top of the toaster oven and for the purpose of suitably ventilating the toaster oven, the said bridge sections 26 are provided with suitable vent apertures 27.

The base 18 is formed between the inlet and outlet openings 24 and 25, respectively, with a channel shaped way, which way is cut away at its intermediate portion to form a longitudinal slot 29 that extends substantially from end to end thereof, and effectively divides the way into laterally spaced flanged guide rails 30.

Disposed within each of the opposite sections 22 is a horizontal U shaped partition wall forming member 31. These partition forming members 31 extend vertically between the base 18 and the upper marginal portions of the casing sections 22 and are held in inturned edges 32 on said opposed casing sections 22. The outer end portion of the U shaped partition forming members 31 are disposed immediately adjacent the flanged guide rails 30 of the way 28 and afford narrow inlet and outlet passage ways 24a and 25a leading respectively to and from an oven chamber 23 formed between opposed offset immediate portions of the opposed U shaped partition members 31. The ends of the oven chamber 23 are defined by the transverse wall portions 31a of the partition members 31.

For heating the oven chamber 33, there is provided suitable electrical heating elements 35. These heating elements 35 are alike and are each disposed within opposed sides of the oven chamber 33 between the transverse wall portions 31a of an opposed U shaped forming member 31. Each of these heating elements 35 is in the nature of a spirally coiled resistance wire strung back and forth over suitable supporting insulators 36 and 37. The supporting insulators 36 and 37 are formed as part of or suitably secured to longitudinally extended support bars 38. These supporting bars 38 which are of suitable electrical insulating and heating resistance material, are slightly longer than the oven chamber 33 and extend through suitable apertures in the oven and forming walls 31a of the partition forming members 31 so that each entire heating element structure is carried by an opposite partition forming member 31.

Preferably and as illustrated by the drawings, the opposed heating elements 35 diverge outwardly from the bottom toward the top so as to obtain uniform application of heat from bottom to top of material passing through the oven. In this respect, it will be noted that the lower longitudinally extended element supporting bars 38 are spaced apart considerably further than the lower rails 38. Since the heat elements illustrated are of the type which generate and radiate heat uniformly from top to bottom, or substantially, and since heat rises rapidly, the accumulative heat effect toward the upper portion of the toasting oven would cause faster toasting of the material near the top of the toasting oven than near the lower portion thereof, were it not for the fact that the elements 35 are spaced progressively further apart from bottom to top. The intermediate, laterally off-set longitudinal wall portions of the partition member 31 are disposed closely adjacent the outer walls of the casing sections 12 and are preferably heat insulated from said casing walls by a suitable layer of asbestos or the like 34.

For feeding sheet like material such as bread slices, crackers and the like placed in the narrow inlet passage way 24a progressively through said inlet passage way 24a, the oven chamber 33, and the narrow vertical outlet 25a, there is provided a feed mechanism immediately to be described in detail.

This feed mechanism includes a train-like series of like rotary feed elements 39 each of which is journaled below the way 28 transversely thereof. The series of rotary feed elements or devices 39 extend in a straight line longitudinally of the way 28 and is vertically aligned with the slot 29 in said way and all thereof are equally spaced from said way. The several rotary feed devices or elements 39 are each mounted fast on a short pin-like stub shaft 40. These stub shafts 40 each project through and are journaled in a longitudinally extended support 41, and mounted fast on the opposite end of each thereof is a drive gear 42. The several drive gears 42 form part of a long train of gears consisting thereof and intermediate idle gears 43 which latter are supported from the mounting member 41 through the medium of fixed journal pins 44.

Figure 4:
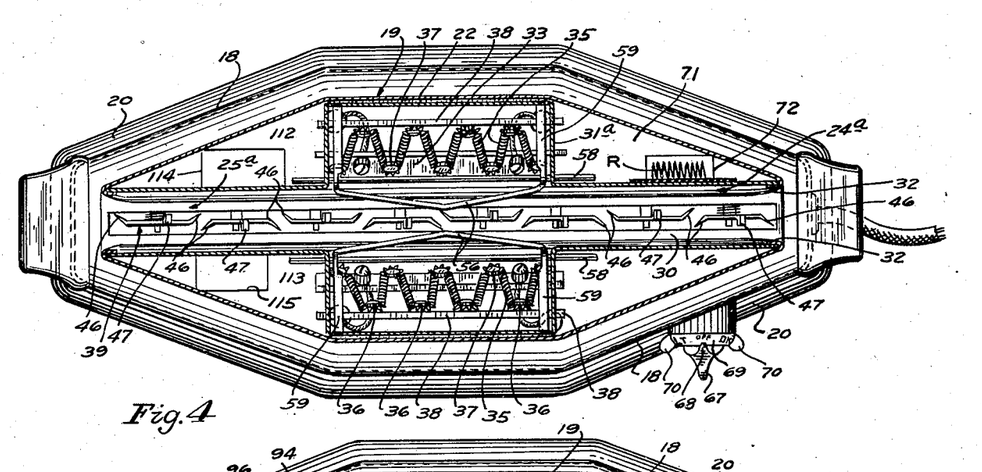
Fig. 4 is a horizontal sectional view taken on the irregular line 4—4 of Fig. 3 and looking downwardly.
Figure 5:
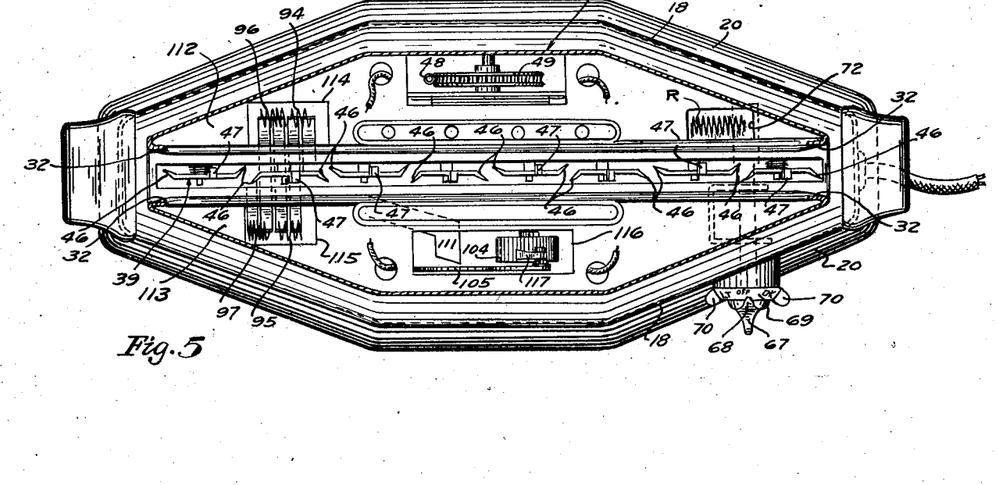
Fig. 5 is a transverse sectional view taken on the line 5—5 of Fig. 3 and looking downwardly.
Figures 6, 7:
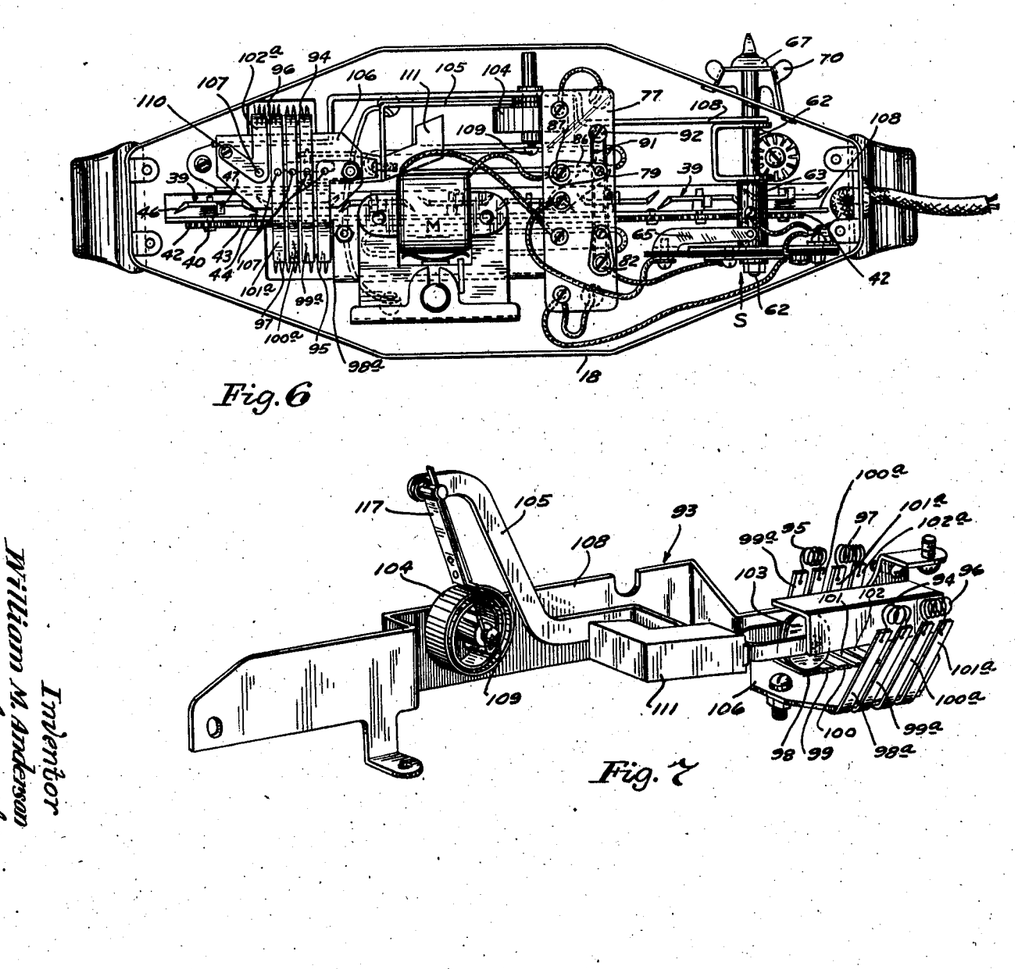
Fig. 6 is a bottom plan view of the toaster with the base mounting plate removed.
Fig. 7 is an enlarged detail perspective view of one of the control devices of the mechanism.
Figure 8:
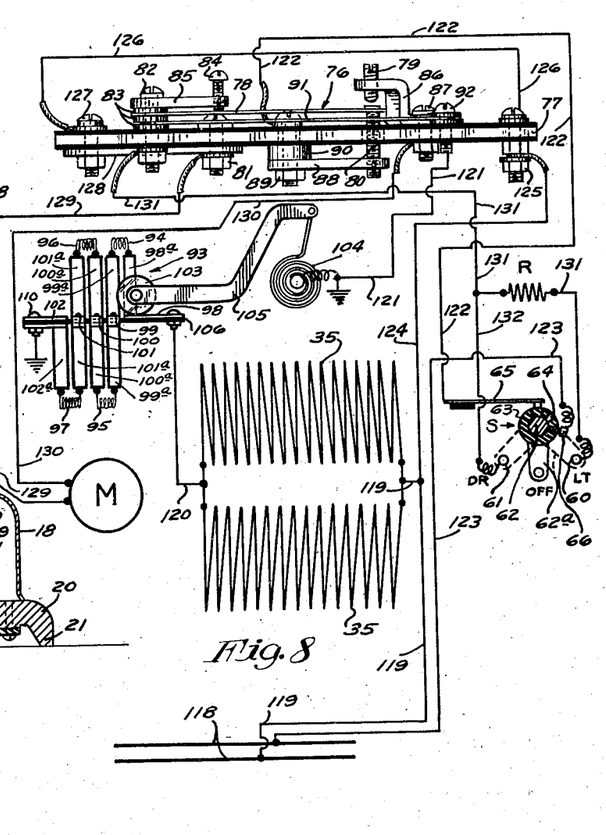
Fig. 8 is a view largely in diagram showing the electric hook up of the various control elements of the mechanism but having some of the control elements illustrated in side elevation on an enlarged scale.

As will be seen particularly by reference to Fig. 4, the rotary feed elements 39 are spaced from the mounting member 41 by means of a spacing sleeve 45. Preferably, and as herein illustrated the rotary feed elements or devices 39 are each formed with radially projecting diametrically opposed pair of long feed dogs 46, and intermediate said long feed dogs 46 with a diametrically opposed pair of radially projecting relatively short feed dogs 47. The adjacent long and short feed dogs 46 and 47, respectively, are preferably spaced 90° apart. The long feed dogs 46 have a radial measurement greater than the distance between the axis thereof and the supporting surface of the way 28, so that under rotation they will alternately project through the way slot 29 and engage and impart step movement to relatively thick sheet material such as the bread slices y resting on the surface of the way and spanning the way slot 29. The short feed dogs 47, on the other hand, have a radial measurement less than the distance between the axis thereof and the supporting surface of the way so that under rotation they will remain below the surface of the way and be engaged only with thin sheet material, such as slabs of crackers or the like x that work through the slot 19 in said way. With this arrangement, it will be obvious, that thin sheet material such as the crackers x which work through the way slot 29 will be engaged and moved alternately by the long and short feed dogs 46 and 47, respectively, and will therefore, be moved at a comparatively high rate of speed, whereas, relatively thick sheet material such as the bread slices y will be engaged and moved only by the long feed dogs 46 and will, therefore, be moved at a considerably reduced speed. The long and short feed dogs 46 and 47 of each rotary feed element 39 are bent over laterally in a like direction, and alternate of said rotary feed elements 39 are reversely applied so that the feed dogs 46 and 47 of alternate rotary feed elements laterally extend in opposite directions, and the several of said rotary feed elements are rotatively positioned alike one with respect to the other. With this arrangement, the long feed dogs 46 of the several rotary feed elements are staggered to form an upwardly opening looking longitudinally of the train thereof, when the same are upwardly projected, and into which thin sheet material such as the crackers x are adapted to seat and to be retained against laterally sliding movement therefrom. Similarly, the short feed dogs 47 of alternate rotary feed elements, being projected in opposite directions, form over all a relatively wide supporting structure for thin material.

For driving the train of gears 42 and 43 and their associated rotary feed elements 39, there is provided a suitable electric motor M having projecting from its rotor a worm drive shaft 48. This worm drive shaft 48 meshes with a large diameter speed reducing worm gear 49 which worm gear is mounted fast on a shaft 50, journaled in a bearing bracket 51. Mounted fast on the other projected end of the shaft 50 is a small pinion gear 52 that meshes with a speed reducing spur gear 53. The spur gear 53 is mounted on a shaft 54 that is, in turn, journaled in the bearing bracket 51. Also, mounted on the shaft 54 concentric with the gear 53 is a small pinion gear 55 that meshes with an intermediate one of the gears 43 of the train of gears 42 and 43. With the gearing above described all of the rotary feed devices 39 will be rotated in unison when the motor M is in operation.

Figure 3:
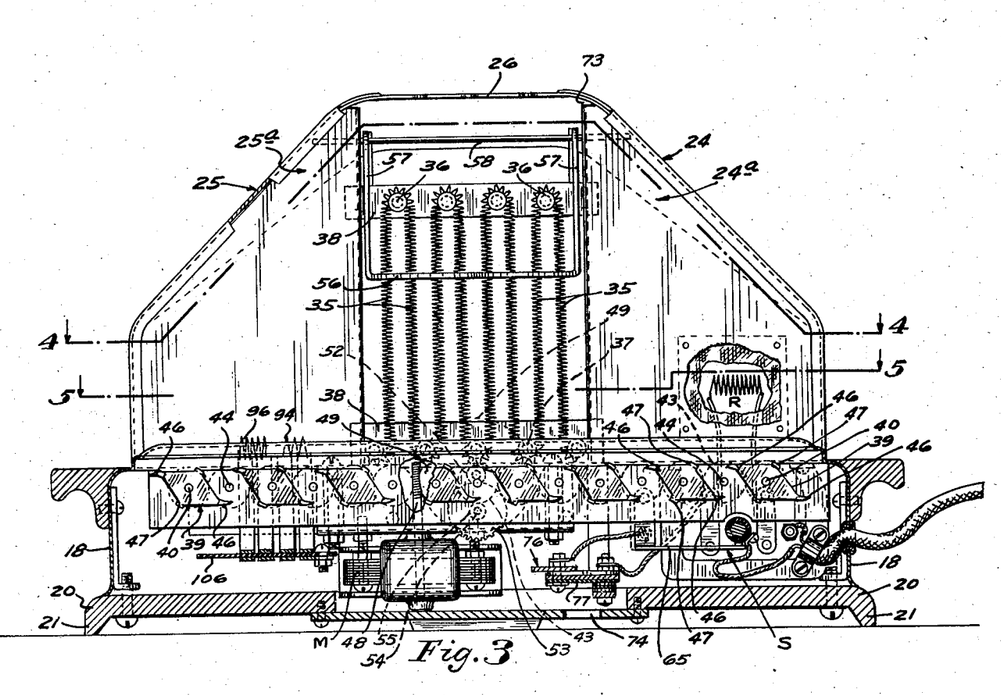
Fig. 3 is a longitudinal sectional view taken approximately on the line 3—3 of Fig. 2.

For automatically centering the slices of bread, crackers, or the like sheet material, between opposite heating elements 35 during its passage through the toaster oven, I provide the highly effective but very simple mechanism presently to be described. Disposed within opposite sides of the toaster oven, in opposed relation are like yieldingly pressed guide shoes 56 that are adapted to slidably, frictionally engage opposite sides of the sheet material of various thicknesses as it passed through the oven, to support the latter in a vertical position laterally centered between the heating elements 35. These opposed friction shoes 56 form the lower longitudinally extended portion of the U shaped brackets, the upright arms 56 of which are pivotally suspended on pivot rods 58 that extend longitudinally of the toaster and through the transverse walls 31a of the partition member 31. The upper end of the upright arms 57 are integrally formed with laterally outwardly upset counter weights 59 which, under the action of gravity, over balance the upright arms 57 and guide shoes 56 and tend to move the latter toward one and aonther to the maximum extent permitted by engagement of the counter balances 59 with the heating element supporting bars 38, which latter act as stops. As illustrated best in Fig. 3, the shoes 56 each diverge outwardly with respect to one and another from which intermediate portions toward their longitudinally end portion so that sheet material of different thicknesses will be permitted to enter between same and by outwardly camming action thereon will cause the same to yield outwardly under continued feeding movement. Preferably the intermediate portions of the guide shoes 56 will be normally spaced apart a distance slightly less than the transverse measurement of the thinnest material to be passed through the toaster, whereas, front and rear ends thereof will normally be spaced apart a distance slightly greater than the transverse measurement of the thickest material to be passed through the toaster.

It will be evident that the toaster mechanism thus far described, all of which is common to that of my co-pending application S. N. 169,637 wherein various novel features thereof are claimed, may be in set action and merely energize the feed motor M and heating elements from a suitable source or sources of potential. Such energization of the feed motor M and heat elements 35 will result in the heating up of the heating elements and uni-directional rotation of the several rotary feed devices 39.

The present invention, which relates to automatic control of the heating means and feeding mechanisms of the general character above described, will next be described in conjunction with the mechanism described and which, as indicated, forms the subject matter of my last identified co-pending application. In accordance with the preferred application of this invention to the toaster mechanism described, the various features of the instant invention are incorporated in and form part of one or the other of the circuits of the toaster.

Before describing the heating element and the feed motor circuits, the several controlling devices will first be individually described. For manually controlling the heating element and motor circuit, there is provided a three position manually operatable control switch S which is in reality, two switches arranged to be controlled in common and having some elements thereof in common. This switch S includes two circumferentially spaced fixed switch contacts 60 and 61, a cooperating switch arm 62a mounted fast on a journalled switch shaft 62 that may be assumed to be electrically insulated from the metallic elements of the toaster body, an insulating bushing 63 fast on the switch shaft 62, a segmental switch contact 64 imbedded in the insulating bushing 63 and electrically connected to the metallic shaft 62, and a spring contact 65 that is anchored fast at one end in insulated relation to the toaster body and at its other or free end is spring pressed toward the insulating bushing 63 and engages either said bushing or the segmental contact 64, thereof, according to the position of the rotary switch elements. The bushing 63 is securely anchored to the shaft 62 through the medium of a set screw 66 and said bushing is so rotatively positioned on the shaft 62 that the contact 64 thereof will be brought into engagement with the free end of the spring contact arm 65 only when the switch arm 62a is in cooperating engagement with the switch contact 60. As will be evident from the drawings, the switch S is located within the base 18 of the toaster body or casing with its journaled switch shaft 62 projecting through one side of the base outwardly of the base. The switch shaft 62, which is insulated from the base, is provided with an operating knob 67 of suitable insulating material. This operating knob 67 is provided with an indicating pointer 68 that works over a segmental dial plate 69 that is provided at its ends with outturned ears 70 that afford suitable stop lugs limiting movement of the knob 67 and rotary switch elements under control thereof to rotary movement between the extremes represented by the fixed contacts 60 and 61. Opposite the position assumed by the pointer 68 of the knob 67 when the switch arm 62a is in engagement with the contact 60, the segmental dial plate 69 carries the mark D. K., meaning dark toast; and opposite the position assumed by the pointer 68 of the knob 67 when the switch arm 62a is in engagement with the switch contact 61 the segmental dial plate 69 is marked L. T., meaning light toast. Midway between these two extreme positions of the knob pointer 68, and in which portion thereof the switch arm 62a is in its inoperative position half way between the contacts 60 and 61, the segmental dial plate carries the mark Off, meaning that the toaster is in an inoperative condition.

For the purpose of cutting down the current flow through the heat elements 35, manual control by the switch S to thereby reduce the heat output of the heating elements 35, is a fixed resistance R. This fixed resistance R, preferably and as illustrated, is located above the base 18 within a chamber 71 adjacent one side of the inlet passage 24a. The chamber 71 is provided directly below the resistance R, with an air inlet opening 72 through the top of the base 18. At its extreme upper portion, this chamber 71 vents through the extreme upper portion of the oven chamber 33 at 73 which oven chamber, is in turn vented to atmosphere at its top through vent openings 27. The purpose of placing the resistance element R in a separate vented chamber is to prevent heat dissipated thereby from adversely affecting thermally responsive control elements hereinafter to be described or letting such dissipated heat become effective on the material passed through the toaster. In order to permit free ventilation of air into the bottom of the base 18 the mounting plate 20 is provided with vent openings 74 through a removable inspection plate 75 in said mounting plate 20.

A duplex control device 76 is provided for performing the following dual function to wit; (a) automatically interrupting operation of the feed mechanism responsive to manual control, until the heating elements 35 have become heated to a desired toasting temperature, and (b) automatic cutting out of the heating element circuit the resistance R, until a desired temperature is built up by the heating element. This double or duplex control device is located within the base 18 and the several parts thereof are mounted on a mounting panel 77 of suitable insulating material such for example as "Bakelite" or hard rubber composition. This duplex thermostatic control 76, in the particular form thereof illustrated, includes mainly a thermally responsive bi-metallic switch arm 78, opposed cooperating fixed contacts 79 and 80, and heating element 91. The bi-metallic switch arm 78 is rigidly anchored to the mounting panel 77 at one end by means of a nut-equipped bolt 82 and spacing washers 83 and is biased in the direction of the contact 80 by means of an adjustable pressure screw 84. The pressure screw 84 is screw threaded through one end of a supporting arm 85 that is interposed between the head of the nut-equipped bolt 82 and the spacing washers 83. The adjustable fixed contact 79 is screw threaded through the free end portion of a metallic mounting bracket 86 which in turn, is anchored to the mounting channel 77 through the medium of a nut equipped bolt or the like 87. The fixed contact 80 is similarly threaded through one end of a mounting bar 88 that is anchored at its other end to the mounting panel 77 through the medium of a nut-equipped bolt or the like 89 and a spacer 90. The adjustable fixed contacts 79 and 80 are preferably spaced apart just sufficiently to prove some clearance between the free end of the thermally responsive switch arm 78 and one thereof when the free end of said switch arm is in engagement with the other thereof. The bi-metallic switch arm 78 is biased by the pressure screw 84 into engagement with the cooperating contact 80 under normal room temperatures with considerable pressure, and is of such character that, under increased temperature, it will tend to warp in the direction of the cooperating contact 79. For heating the bi-metallic switch arm 78 there is provided a resistance wire heating element 91 that is in the nature of a resistance wire loop directly underlying the bi-metallic switch arm 78. At one end this resistance wire loop 91 is anchored between two metallic spacers 83 on the nut-equipped bolt 82 and the other end said loop is anchored by means of an anchor screw and spacing washer 93. The opposite sides of the wire loop 91 are closely adjacent opposite sides of the screw contact 80 but are spaced electrically from said screw contact 80.

The next and last control device to be described has as its purpose the automatic regulation of the oven temperature, and is what I term a modulating type of control in that it progressively varies the heating rate of the heating elements without interrupting operation thereof, as distinguished for example, from the so called intermittent type of control which regulates temperature by intermittently cutting the source of heat into and out of action. This last noted control, which is indicated as an entirety by 93, is in its preferred form herein illustrated, in the nature of a thermally actuated variable resistance device associated with the circuit of the heating elements 35. As illustrated this control 93 comprises mainly a plurality of resistance sections 94, 95, 96 and 97; a switch made up of spaced fixed contacts 98, 99, 100, 101, and 102 and a movable switch contact in the nature of a roller 103; and a thermally responsive actuator in the nature of a bi-metallic helix 104 that is connected to operate the roller 103 through the medium of an arm 105. The contacts 98 to 102, inclusive, are mounted on a flat sheet of insulating material 106. Underlying the contacts 98, 99, 100, 101, and 102, respectively, are metallic conductor bars 98a, 99a, 100a, 101a, and 102a. These metallic conductor bars are spaced from their respective underlying contacts by the insulating sheet 106 but are electrically connected to their respective opposing contacts by rivets or the like 107 passed therethrough and the opposing contacts and the interposed sheet of insulating material. By means of these rivets 107, the several switch contacts 98 to 102, inclusive, and their respective cooperating opposed conductor bars 98a to 102a are securely anchored in position. The resistance sections 94, 95, 96, and 97 are preferably of progressively increasing value. Through the medium of the conductor bars 98a to 102a, said resistance sections are connected in series in the other of their progressively increasing value. In fact, the said resistances are mounted directly on the end portions of the conductor bars. The said resistance sections are preferably formed of resistance wire coils and each thereof starting with the resistance section 94 and ending with the resistance section 102, each successive resistance action may be assumed to include an additional convolution. The insulating strip 106 and the thermally responsive helical actuator 104 are preferably mounted on a frame member 108 that is adapted to be suitably removably mounted within the base 18. The helical bi-metallic actuator is adjustably anchored at its center by means of a nut-equipped screw or the like 109 to this frame member 108. The insulating plate 106 is suitably rigidly secured to one end portion of the frame 108 and means inclusive of a terminal screw 110. The free end of the helix 104 is pivotally connected to the arm 105 so that under warping action of the bi-metallic helix as a result of temperature changes, the roller contact 103 will be moved over the contacts 98 to 102, respectively. In the arrangement illustrated, the helix is so adjusted through the medium of the anchor screw 109 that at ordinary room temperatures the roller contact 103 will rest upon the contact 98 and the bi-metallic helix 109 is so formed that it will tend to unwind under progressively increasing temperature and under such increased temperature moved the roller contact 103 in the direction of the first contacts of higher number. Preferably the periphery of the roller contact 103 and the engaged surfaces of the contact 98 and 102, inclusive, are of highly conductive material such as silver. In order to insure satisfactory pressure between the roller contact 103 and its cooperating fixed contacts, the arm 105 is preferably weighted as at 111. When the complete unit 93 is placed in operative position, the resistance sections 94, 95, 96 and 97 will be disposed above the base 18 within chambers 112 and 113, which, like the chamber 71 are vented at their top through the medium of the top of the toaster oven. In this respect, it will be noted that the several conductor bars 98a to 102a are turned upwardly at their opposite ends so that the resistance sections 95 and 97 are considerably laterally spaced from the resistance sections 94 and 96 and all of said resistance sections are projected a considerable distance above the switch contacts 98 to 102. For the purpose of admitting the resistance-section-equipped ends of the conductor bars 98a to 102a, the base is provided with apertures 114 and 115 located respectively below the chambers 112 and 113 and on opposite sides of the inlet passage way 25a. The resistance elements 94 to 97, inclusive, are in this manner located in ventilated chambers where heat dissipated therefrom will have no material effect on any of the elements of the toaster. The helix actuator 104 is so lcoated that part thereof projects through an aperture 116 in the top of the base 18 and into the toasting oven 33 so that it will be effected to a desired extent by oven temperature. To further increase the effect of oven temperature on the actuator 104, the radially out turned end 117 thereof which connects directly to the arm 105 projects well up into the toasting oven behind the heat element 35 on one side thereof and does therefore, conduct heat directly to the actuating element 104. It will be obvious that as oven temperature builds up the helically wound, bimetallic element 104 will tend to open and thereby move the roller contact successively into engagement with the several contacts 98 to 102. In this respect, it may be here stated that the preferred arrangement is such that the roller contact 103 will come to rest on the contact 102 when a maximum desired toasting temperature is built up in the oven. The circuits of the feed motor M and heating elements 35 and their associated control elements will be described in conjunction with the recitation of the operating of the complete apparatus.

*Operation*

Figure 1:
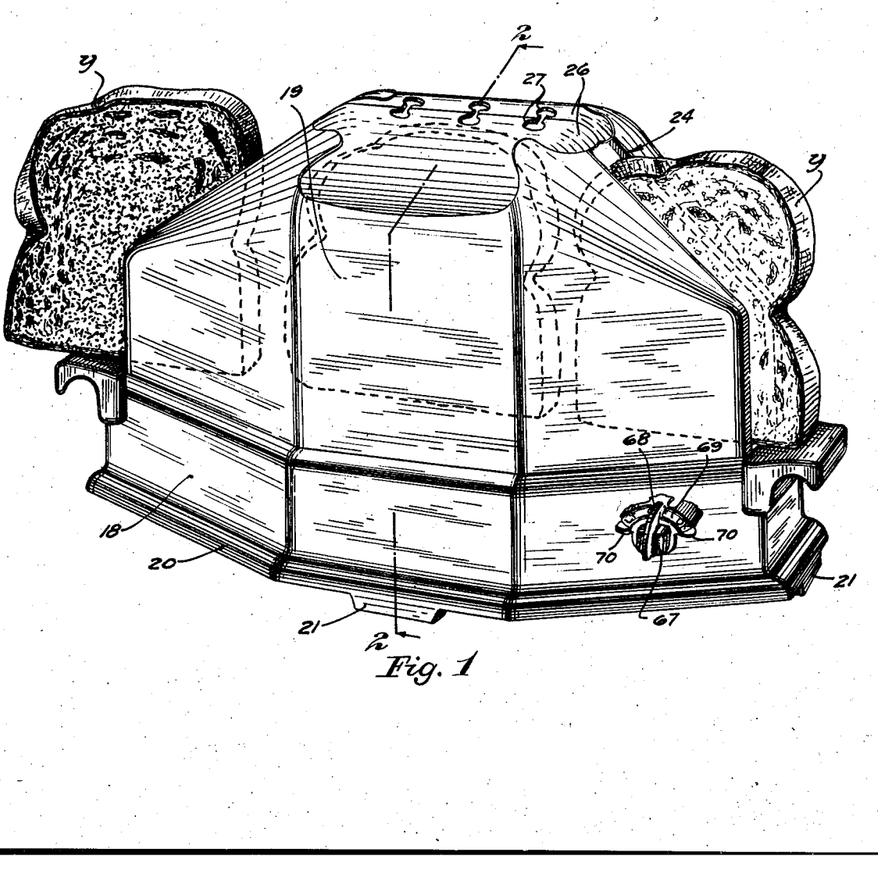
Fig. 1 is a perspective view of a complete toaster mechanism incorporating the several features of the invention illustrating the same in operative condition.
Figure 2:
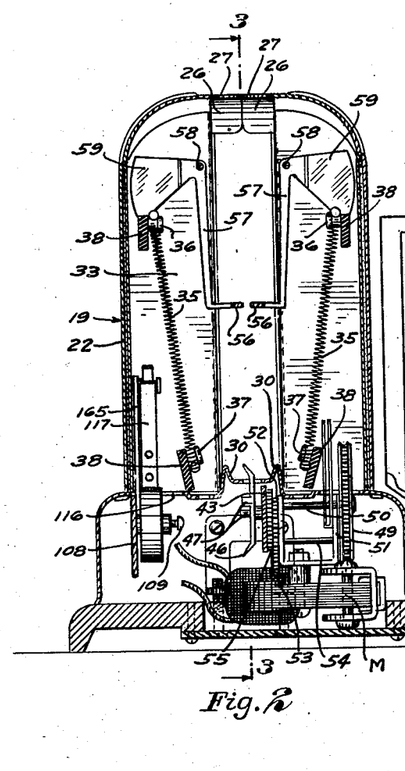
Fig. 2 is a transverse sectional view taken on the line 2—2 of Fig. 1.

It may be assumed for the purpose of this case that the circuits of the heating elements 35 and feed motor M are to be energized from a conventional source of potential such as a 110 volt A. C. power line 118. As previously indicated, when the switch S is in its intermediate position wherein the pointer on the switch knob is opposite the mark "Off" on the segmental dial plate 70, both the feed motor and heating elements will be disconnected from their source of potential and will be completely inoperative. If it is desired to set the toaster mechanism in operation for the making of light colored toast, the switch knob 67 will be turned so that its pointer 68 is opposite the mark L. T. on the segmental dial 70. In this position of the switch knob 67, the switch arm 62a of the switch S will be in engagement with the contact 60, and the segmental contact 64 will be in engagement with the spring contact 65. Any time before the switch S is moved to its low heat position indicated, a slice of bread y may be placed within the inlet passage 24a as shown for example at the right in Figure 1. Upon setting of the switch S in the position above noted, the following noted circuit will be closed through the heating elements 35. This initial heating element circuit consists of a lead 119 extending from one side of the power line 118 to one side of each of the heating elements 35, which heating elements are connected in parallel, a lead 120 extending from the other side of each of the parallel connected heating elements 35 to the fixed contact 98 of the variable resistance device 93, the now engaged roller 103, the arm 105, the bi-metallic actuator 104, a lead 121, which is connected to one end of the heating element 91 of the duplex control 66 through the screw 92, the heating element 91, the bi-metallic switch arm 78, the engaged contact 80, the mounting bar 88, the nut equipped bolt 89, a lead 122, the spring switch arm 65 of the switch S and its now engaged segmental contact 64, the switch shaft 62, screw 66, and a lead 123 that connects to the other side of the power line 118. That portion of the circuit above described consisting of the bi-metallic switch arm 78, its cooperating fixed contact 80, the mounting bar 88, nut-equipped bolt 89, lead 122, spring switch contact 65, and its engaged segmental contacts 64 constitute, as will hereinafter be evident, a shunt circuit around the fixed resistance R.

Next to be described will be the circuit of the feed motor M, which is primarily controlled by the manual control switch S and which will be set for action by the manually controlled switch when moved to either of its operating positions. This circuit, which is automatically interrupted during the initial warming up period of the toaster oven, consists of a lead 119 from one side of the power line 118, a lead 124, a terminal screw 125, a lead 126, a terminal screw 127, a bust bar lead 128, a terminal screw 81, a lead 129 connected to one side of the motor M, a lead 130 extending from the other side of the motor M to the nut equipped bolt 87, mounting bracket 86, contact 79, the bi-metallic switch arm 78, the nut equipped bolt 82, a lead 131 having interposed therein the resistance R, the contact 60 and arm 62 of switch S, the metallic shaft 62 and set screw 66, and lead 123 which leads to the other side of the power line 118. When the switch S is first set in its low heat position described, the heating element circuit described will be completed by said switch and by the cooperating contacts 78 and 80 of the duplex control device 66, which latter contacts are engaged when the toaster is in a cold state and the heating elements 35 will immediately begin heating up. However, the described motor circuit is interrupted by virtue of the space existing between contact 78 and 79 of the duplex control 66 when the toaster is in a cold state so that said mechanism will initially be inoperative. Hence, a slice of bread initially placed in the inlet pasage way 25a will remain stationary in said passage way during the initial warming up period of the toasting oven.

Of course, as soon as the heating element circuit is completed in the manner previously stated, the auxiliary heating element 91 of the duplex control 66, being in series with the main heating element circuit, will become heated and by radiation and conductivity will gradually heat up the bi-metallic switch arm 78, which latter under this increased temeperature will tend to warp away from contact 80 and into engagement with the contact 79. As before indicated the biasing pressure exerted by the pressure screw 84 will be so adjusted that the bi-metallic switch arm or contact 78 will remain in engagement with the contact 80 during the initial warming up period of the toaster and will move out of engagement with the contact 80 and into engagement with the contact 79 co-incidentally with the obtaining of the desired toasting temperature in the toaster oven.

If it is determined by experiment that a predetermined time interval of, say for example, 1½ minutes is required for the heating elements to build up a desired maximum toasting temperature within the toasting oven, then the bi-metallic element 78 will be biased through the medium of the pressure screw 84 so that it will move out of engagement with the contact 80 and into engagement with the contact 79 1½ minutes after energization of the heating element circuit.

As soon as this last noted change occurs, two important functions are brought about, these being as follows to wit; (a) the circuit of the motor M will be completed, thereby rendering the feed mechanism operative, with the result that a slice of bread initially placed within the inlet passage way 25a will start its progressive movement through the toasting oven, and (b) the above referred to shunt circuit around the resistance R, and which was previously closed through the previously engaged contact 78 and 80, will be opened thereby permitting this portion of the heating element circuit to be closed through the resistance R. The heating element circuit will now be completed through the lead 131, inclusive of the resistance R, the now engaged contact 60 and switch 62a of the switch S, the shaft 62 and set screw 66 of said switch, and lead 123, which connect back to the other side of the power line.

The object of the thermally controlled shunt circuit around the resistance R when the manual control switch is initially set in its low heat position, is to remove temporarily the resistance R from the heating element circuit so as to permit the heating element to heat up in a minimum of time and then to automatically couple said resistance R into the circuit after and only after a predetermined desired toasting temperature is obtained in the toasting oven. Of course, when the resistance R becomes effective in the heat element circuit, it reduces the circuit flow therethrough and definitely prevents the heating element from reaching as high a maximum temperature, as would be the case without interposing said resistance.

The heating elements 35 will, of course, after reaching a desired toasting temperature gradually tend to build up additional heat in the oven over a period of several minutes, but this tendency to build up a high temperature in the toasting oven, is very efficiently controlled by the variable resistance device 93 which is adjusted to function substantially as follows: as the oven temperature starts building up from its normal starting temperature, usually room temperature, the helical bi-metallic actuator 104, being subject to such increased temperature, will start slightly unwinding and will thereby gradually move the contact roller 103 in the direction of the contact 102. At the start, of course, when the roller 103 is engaged with the contact 98, the heating element circuit will be closed entirely independently of any of the resistance sections 94 to 97, inclusive. The speed of response of the actuator element 104 is such that, when properly adjusted, the roller contact 103 will be moved out of engagement with the contact 98 and into engagement with the contact 99 co-incidentally with the starting of the feed motor M and the cutting in of the resistance R. Of course, as soon as the roller contact 83 disengages contact 98, and engages contact 99, the heating element circuit will then be closed through the resistance 94, which will slightly reduce the current flow through the heating elements and partially reduce their tendency to overheat the oven. For the next several minutes of operation, the actuator 104 will continue to respond to gradual increasing oven temperature and will, as a result thereof, progressively move the roller contact 103 into successive engagement with the contacts 100 and 101 and 102, thereby progressively connecting resistance sections 95, 96, and 97 serially in the heating element circuit until finally when the roller contact 103 reaches the contact 102, the several resistance sections 94 to 97 inclusive will all be connected in series in the heating element circuit. When this point is reached, the current flow through the heating element 35 will be reduced to a point where radiation from the toaster to room atmosphere will off-set any further rise in temperature and thereafter, the toasting temperature will remain substantially constant. It is important to note that the contact 102 is electrically connected through the frame 108 to the actuator 104 so that should the roller 103 be accidentally moved out of engagement with a contact 98 to 102, the circuit of the heating element will then be completed through the several resistance sections 94 to 97, inclusive.

With the above described arrangement, the first slice of bread or like sheet material to be passed through the toasting oven will be toasted to the same extent as succeeding slices that will pass through the toaster and this regardless of whether or not the succeeding slices be passed through one immediately following the other or with a considerable time lapse therebetween. Of course, with the switch S set on the low heat side as indicated, the bread slice will be toasted to a light brown color by virtue of the fact that the resistance R is in the circuit. It may be well here to state that, although the circuit of the feed motor is closed through the resistance R, when the switch S is set on the low heat side, that the slightly reduced voltage resulting from the interposition of this resistance R in the circuit, has virtually no effect on the speed of the motor M, since the motor M is of the induction type in which the speed is largely determined by the frequency of the cycles of the alternate current source.

When it is desired to make deeper or darker toast, the operator will simply set the device in action by turning the switch S to its high heat position marked D. K. In this instance, the motor circuit will be completed as previously described down to the resistance R but, being the lead 131 is no longer in engagement with the switch arm 62a, the current cannot flow through the resistance R so will flow through lead 132, the switch contact 61, the switch arm 62a, the switch shaft 62, and lead 123 back to the other side of the line, thereby completing the motor circuit. Of course, when the switch S is turned for high heat or dark toast, the circuit of the feed motor M will be interrupted until the temperature in the oven has been built up to a desired point by the temporary disengagement of the switch contact elements 79 and 80, just as in the first recited form. From the diagram, it would be obvious that when the switch S is turned to its high heat or dark toast position, the heating element circuit will be immediately closed independently of the now open shunt circuit consisting of the switch contact elements 78 to 80, member 88, nut-equipped bolt 89, a lead 122, spring contact 65 and segmental contact 64, since the circuit is then broken. With the switch thus set, the heating element circuit will initially be closed and will remain closed through lead 131, contact 61, of switch S and switch arm 62 of switch S. Virtually the only difference in the operation of the mechanism when the switch is set in its dark toasting high heat position and when said switch is set in its low heat position, is that in the latter instance the fixed resistance R is automatically connected in series with the heating element after an approximately predetermined temperature has been built up in the toasting oven. In either instance, the first and each successive slice of bread or like material passed progressively through the toaster will be toasted to a substantially even degree, although in the one case the product will be toasted to a dark brown rather than light.

What I claim is:

1. In an automatic electric toaster, an electric heating element, feed mechanism for moving material past the heating element and including an electric motor, independent circuits for said heating element and electric motor, a common control switch for said circuits, a current flow reducing resistance interposed in the heating element circuit, an auxiliary heating element operated from the heating element circuit, a thermally responsive switch arm associated with said auxiliary heating element, opposed fixed switch contacts located on opposite sides of said thermally responsive switch arm and between which said switch arm is movable, said motor circuit including one of said fixed switch contacts and said thermally responsive switch arm, a shunt circuit around said current reducing resistance including the other of said fixed switch contacts and said switch arm, and adjustable bias means normally maintaining said switch arm in engagement with the said shunt circuit fixed switch contacts and out of engagement with the said motor circuit fixed switch contacts until a predetermined temperature has been obtained in the switch arm and permitting warping of the switch arm out of engagement with the said shunt circuit fixed switch contact and into engagement with the motor circuit fixed switch contact when the said predetermined temperature is obtained.

2. The structure defined in claim 1 in further combination with a variable resistance interposed in the heating element circuit and a thermally responsive actuator for said variable resistance subject to heat from the oven heating element and constructed and arranged to adjustably increase the effective value of the variable resistance under increasing temperature.

3. In an automatic electric toaster, a toasting oven, a heating element for the toasting oven, feed mechanism for moving material completely through the toasting oven and including an electric motor, a circuit for the heating element, a circuit for the said motor, a variable resistance, automatic means completing the heating element circuit independently of said variable resistance when oven temperature is below a predetermined point, and after such predetermined temperature has been obtained, completing said heating element circuit through a progressively increasing portion of said variable resistance under continued rising temperature, a current reducing resistance, a common manual control switch for said heat element and feed motor circuits, said manual control switch being constructed and arranged to close each of said circuits in either of two positions and in one of said two positions to close the heating element circuit through said resistance and in the other of said two positions to close the heating element circuit independently of said resistance, a shunt circuit around said last noted resistance, and automatic means closing said shunt during the initial warming up period of the toaster and opening the same after the said predetermined temperature has been obtained.

4. In an automatic electric toaster, a toasting oven, a heating element for the toasting oven, feed mechanism for moving material completely through the toasting oven and including an electric motor, a circuit for the heating element, a circuit for the said motor, a current reducing resistance, a common manual control switch for said heat element and feed motor circuits having a circuit open position and two circuit closed positions, said manual control switch being constructed and arranged to close each of said circuits in either of said two closed positions and in one of said two closed positions to close the heating element circuit through said resistance and in the other of said two closed positions to close the heating element circuit independently of said resistance, a shunt circuit around said last noted resistance; and an automatic switch closing said shunt circuit during the initial warming up period of the toaster, when said manual control switch is set up in its closed position wherein the said reducing resistance is set for operation, and automatically opening the said shunt circuit upon building up a predetermined temperature in the oven.

5. In an automatic electric toaster, a toasting oven, a heating element for the toasting oven, feed mechanism for moving material completely through the toasting oven and including an electric motor, a circuit for the heating element, a circuit for the said motor, a current reducing resistance, a common manual control switch for said heat element and feed motor circuits having a circuit open position and two circuit closed positions, said manual control switch being constructed and arranged to close each of said circuits in either of said two closed positions and in one of said two closed positions to close the heating element circuit through said resistance and in the other of said two closed positions to close the heating element circuit independently of said resistance, a shunt around said last noted resistance, and a two position automatic switch for the motor and shunt circuits and closing opposite thereof in opposite positions; said automatic switch being constructed and arranged to automatically interrupt the feed motor circuit in either closed position of the manual control switch during the initial warming up period of the toaster, to automatically complete said shunt circuit during the initial warming up period of the toaster when the manual control switch is set in the closed position wherein said reducing resistance is set for operation, to automatically complete the motor circuit in either closed position of the manual control switch when a predetermined temperature has been built up in the oven, and, when said manual switch is set in the closed position wherein said reducing resistance is set for operation, to automatically open said shunt circuit and render said resistance operative upon building up of a predetermined temperature in the oven.

6. In an automatic electric toaster, a toasting oven, a heating element for the toasting oven, feed mechanism for moving material completely through the toasting oven and including an electric motor, a circuit for the heating element, a circuit for the said motor, a variable resistance, automatic means completing the heating element circuit independently of said variable resistance when oven temperature is below a predetermined point and, after such predetermined temperature has been obtained, completing said heating element circuit through a progressively increasing portion of said variable resistance under continued rising temperature, a fixed value current reducing resistance, a common manual control switch for said heat element and feed motor circuits, said manual control switch having a circuit open position and two circuit closed positions being constructed and arranged to close each of said circuits in either of said two closed positions and in one of said two closed positions to close the heating element circuit through said resistance and in the other of said two closed positions to close the heating element circuit independently of said resistance, a shunt circuit around said last noted resistance, and a two position automatic switch for the motor and shunt circuits, and closing opposite thereof in opposite positions; said automatic switch being constructed and arranged to automatically interrupt the feed motor circuit in either closed position of the manual control switch during the initial warming up period of the toaster, to automatically complete said shunt circuit during the initial warming up period of the toaster when the manual control switch is set in the closed position wherein said reducing resistance is set for operation, to automatically complete the motor circuit in either closed position of the manual control switch when a predetermined temperature has been built up in the oven, and, when said manual switch is set in the closed position wherein said reducing resistance is set for operation, to automatically open said shunt circuit and render said resistance operative upon building up of a predetermined temperature in the oven.

7. In an automatic electric toaster, a toasting oven, a heating element for the toasting oven, feed mechanism for moving material completely through the toasting oven, a circuit for the said motor, a variable resistance, automatic means for completing the heating element circuit independently of said variable resistance when oven temperature is below a predetermined point and, after such predetermined temperature has been obtained, completing said heating element circuit through a progressively increasing portion of said variable resistance under continued rising temperature, a current reducing resistance, a common manual control switch for said heat element and feed motor circuits, said manual control switch having an open position and two closed positions and being constructed and arranged to close each of said circuits in either of two closed positions and in one of said two closed positions to close the heating element circuit through said resistance and in the other of said two closed positions to close the heating element circuit independently of said resistance, and an automatic switch for effectively cutting said current reducing resistance out of the heating element circuit during the initial warming up of the toaster when the said reducing resistance is set for operation by the manual control switch and automatically cutting the said reducing resistance into the heating element circuit upon building up of a predetermined oven temperature at a time when said reducing resistance is set for operation by said manual control switch.

8. In an automatic electric toaster, a toasting oven, a heating element for the toasting oven, feed mechanism for moving material completely through the toasting oven and including an electric motor, a circuit for the heating element, a circuit for the said motor, a variable resistance, automatic means completing the heating element circuit independently of said variable resistance when oven temperature is below a predetermined point and, after such predetermined temperature has been obtained, completing said heating element circuit through a progressively increasing portion of said variable resistance under continued rising temperature, a current reducing resistance, a common manual control switch for said element and feed motor circuits, said manual control switch having a closed position and two open positions and being constructed and arranged to close each of said circuits in either of said two closed positions and in one of said two closed positions to close the heating element circuit through said reducing resistance and in the other of said two closed positions to close the heating element circuit independently of said resistance, and an automatic control switch associated with the motor and heating element circuits; said automatic switch being constructed and arranged to effectively cut said reducing resistance out of the heating element circuit during the initial warming up period of the toaster when the reducing resistance is set for operation by said manual control switch, automatically interrupting the motor circuits during the initial warming up period of the toaster when the manual control switch is set in either of its closed positions, automatically cutting said resistance into the heating element circuit when a predetermined temperature is built up at a time when said resistance is set for operation by said manual control switch, and automatically closing the motor circuit after a predetermined temperature has built up in the oven.

9. In an automatic electric toaster, a toasting oven, a heating element for the toasting oven, feed mechanism for moving material completely through the toasting oven and including an electric motor, a circuit for the heating element, a circuit for the said motor, a current reducing resistance, a common manual control switch for said heat element and feed motor circuits, said manual control switch having a circuit open position and two circuit closed positions and being constructed and arranged to close each of said circuits in either of said two closed positions and in one of said two closed positions to close the heating element circuit through said resistance and in the other of said two closed positions to close the heating element circuit independently of said resistance, a shunt circuit around said last noted resistance, and automatic means closing said shunt circuit during the initial warming up period of the toaster when said resistance is set for operation by the manual control switch and opening the said shunt circuit after the said predetermined temperature has been obtained in the toasting oven.

10. In an automatic electric toaster, a toasting oven, a heating element for the toasting oven, feed mechanism for moving material completely through the toasting oven and including an electric motor, a circuit for the heating element, a circuit for the said motor, a current reducing resistance, a common manual control switch for said heat element and feed motor circuits, said manual control switch having one open position and two closed positions and being constructed and arranged to close each of said circuits in either of said two closed positions and in one of said two closed positions to close the heating element circuit through said resistance and in the other of said two closed positions to close the heating element circuit independently of said resistance, and automatic switch associated with the motor and heating element circuit; said automatic control switch being constructed and arranged to effectively cut said reducing resistance out of the heating element circuit during the initial warming up period of the toaster when said reducing resistance is set for operation by said manual control switch, to automatically interrupt the motor circuit during the initial warming up period of the toaster when the manual control switch is set in either of its two closed positions, to effectively cut said reducing resistance into the heating element circuit when a predetermined temperature has been built up and said resistance is set for operation by the manual control switch, and in either closed position of the manual control switch automatically closing the motor circuit after said predetermined temperature has been obtained.

11. In an automatic electric toaster, a toasting oven provided with an electric heating element, feed mechanism for moving material into and through the toasting oven and including an electric motor, independent circuits for said heating element and electric motor, a current reducing resistance, a common automatic switch associated with each of said circuits, a common control switch for each of said circuits located ahead of said common automatic control switch and said current reducing resistance and having a two circuit open position and a two circuit closed position, said automatic control switch being constructed and arranged to automatically interrupt the said motor circuit irrespective of a circuit closed position of the common control switch and to close the heating element circuit independent of said resistance when the common control switch is set in circuit closed position at a time when the toasting oven is below a predetermined temperature and, dependent upon maintaining of the control switch in closed position to automatically effect completion of the motor circuit and closing of the heating element circuit through said current reducing resistance upon building up of a desired temperature in the toasting oven.

WILLIAM M. ANDERSON.